United States Patent
Endo

(10) Patent No.: US 7,829,209 B2
(45) Date of Patent: Nov. 9, 2010

(54) SOLID POLYMER ELECTROLYTE FOR FUEL CELL AND FUEL CELL CONTAINING THE SAME

(75) Inventor: Hiroko Endo, Yokohama (JP)

(73) Assignee: Samsung SDI Co., Ltd., Suwon (KR)

( * ) Notice: Subject to any disclaimer, the term of this patent is extended or adjusted under 35 U.S.C. 154(b) by 1268 days.

(21) Appl. No.: 11/253,657

(22) Filed: Oct. 20, 2005

(65) Prior Publication Data

US 2006/0089441 A1   Apr. 27, 2006

(30) Foreign Application Priority Data

Oct. 22, 2004   (JP)   ............... 2004-308358
Feb. 4, 2005    (KR)   ............... 10-2005-0010816

(51) Int. Cl.
  *H01M 8/10*   (2006.01)
  *C08K 3/32*   (2006.01)
(52) U.S. Cl. ......................... 429/33; 524/417
(58) Field of Classification Search .......... 429/33; 524/417

See application file for complete search history.

(56) References Cited

U.S. PATENT DOCUMENTS 6,028,030 A * 2/2000 Nakano et al. .............. 503/209

FOREIGN PATENT DOCUMENTS

| JP | 8-504293    | 5/1996  |
| JP | 2002-280019 | 9/2002  |
| JP | 2002-358978 | 12/2002 |

OTHER PUBLICATIONS

Development of The Membranes for PEFC (GMC Co., Ltd.; p. 98, May 2002).*

Development of Ionic Exchanging Membrane for Solid Polymer Fuel Cell (GMC Co., Ltd., p. 98, May 2002.

* cited by examiner

*Primary Examiner*—Patrick Ryan
*Assistant Examiner*—Karie O'Neill Apicella
(74) *Attorney, Agent, or Firm*—H. C. Park & Associates, PLC

(57) ABSTRACT

A solid polymer electrolyte for a fuel cell has high proton conductivity, large heat resistance, an excellent mechanical strength. A fuel cell may include such solid polymer electrolyte. The solid polymer electrolyte for a fuel cell includes a proton conductive resin with side chains $R_1$, $R_2$, $R_3$, and $R_4$ that are bonded to an aromatic polyurea resin backbone.

9 Claims, No Drawings

SOLID POLYMER ELECTROLYTE FOR FUEL CELL AND FUEL CELL CONTAINING THE SAME

CROSS-REFERENCE TO RELATED APPLICATIONS

This application claims priority to and the benefit of Japanese Patent Application No. 2004-308358, filed on Oct. 22, 2004, in the Japanese Patent Office, and Korean Patent Application No. 10-2005-0010816, filed on Feb. 4, 2005, in the Korean Patent Office, the disclosure of which is incorporated herein in its entirety by reference.

BACKGROUND OF THE INVENTION

1. Field of the Invention

The present invention relates to a solid polymer electrolyte that is suitable for a fuel cell that generates electricity by humidifying an electrolyte membrane, and a fuel cell containing the same.

2. Description of the Background

As environment pollution increases, developments in clean energy have drawn much attention around the world. For example, since the number of automobiles has increased due to increased transportation traffic networks, the air pollution resulting from the exhaust gas that is generated from internal-combustion engines of cars has been a problem. In response to this problem, electric cars and hybrid cars that include fuel cells may be used because they are lightweight, can be handled easily, and do not pollute the air. In addition, fuel cells may also be used at home.

Fuel cells may be divided into categories including alkali fuel cells, phosphoric acid fuel cells, molten carbonate fuel cells, solid electrolyte fuel cells, solid polymer fuel cells and the like, depending on the type of electrolytic solution used. In particular, solid polymer fuel cells draw attention as an energy source for electric automobiles and use at home, for example because solid polymer type fuel cells may be handled easily at low temperatures and exhibit large output density.

Proton conductive membranes may be used as electrolytes for solid polymer fuel cells. Proton conductive membranes have high ionic conductivity with respect to protons that are involved in the reactions at electrodes of fuel cells. Conventionally, fluorinated polymers that include a superacid group may be used as proton conductive membranes. However, fluorinated polymers that include a superacid group are expensive and must be humidified because the medium for proton conductivity is water.

In order to have proton conductivity, an ionic group such as a carboxylic acid group, a sulfonic acid group, a phosphoric acid group, or the like may be included in an aromatic structure, which is disclosed in Japanese Patent Nos. 2002-280019 and 2002-358978. In this case, however, these ionic groups are easily released at high temperatures, have damage flexibility of proton conductive membranes, and have low proton conductivity. Although Japanese Patent No. Hei 8-504293 also discloses the above-related components, proton conductivity is not mentioned.

In addition, a method of introducing an active hydrogen group by reacting polybenzimidazole with sultone is disclosed in "Development of Ionic Exchanging Membrane for Solid Polymer Fuel Cell" GMC Co. Ltd., p. 98, May 2000. In this case, however, only a sulfonic acid group may be introduced, and other active hydrogen groups may not be applied.

SUMMARY OF THE INVENTION

The present invention provides a solid polymer electrolyte for a fuel cell with high proton conductivity, large heat resistance, and large mechanical strength, and a fuel cell containing the same.

Additional features of the invention will be set forth in the description which follows, and in part will be apparent from the description, or may be learned by practice of the invention.

The present invention discloses a solid polymer electrolyte for a fuel cell, including a proton conductive resin with structural Formula 1 having side chains $R_1$, $R_2$, $R_3$ and $R_4$ bonded to an aromatic polyurea resin backbone.

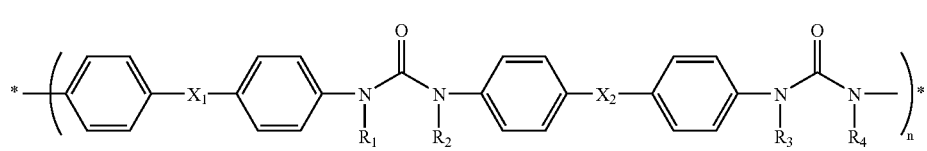

Structural Formula 1

In Structural Formula 1, each of $X_1$ and $X_2$ may include, but is not limited to S, O, a sulfonyl group, a $C_{1-3}$ linear methylene group, a difluoromethylene group, a hexafluoropropylene group, and a hetero aromatic ring. In addition, at least one of the side chains $R_1$, $R_2$, $R_3$, and $R_4$ is an alkylsulfonic acid group or a carboxylic acid group, and n is in the range of about 20 to about 1000.

It is to be understood that both the foregoing general description and the following detailed description are exemplary and explanatory and are intended to provide further explanation of the invention as claimed.

DETAILED DESCRIPTION OF THE INVENTION

According to the present invention, a solid polymer electrolyte for a fuel cell with high proton conductivity, large heat resistance, an excellent mechanical strength, and a fuel cell that includes the solid polymer electrolyte are provided.

A solid polymer electrolyte for a fuel cell of the present invention includes a proton conductive resin with a side chain that has an active hydrogen group at its terminal bonded to a polyurea resin backbone. The side chain is branched from a urea group and/or urethane group of the polyurea resin. Other structures of the polyurea resin may not exhibit high proton conductivity.

The solid polymer electrolyte for fuel cell of the present invention includes a proton conductive resin that has side chains $R_1$, $R_2$, $R_3$, and $R_4$ bonded to an aromatic polyurea resin backbone. The proton conductive resin may be represented by Structural Formula 1:

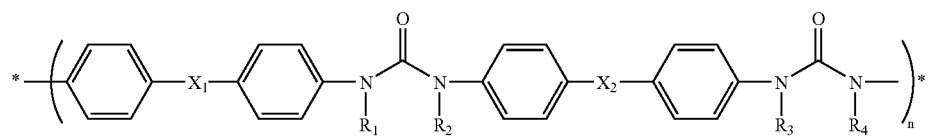

Each of $X_1$ and $X_2$ may include, but is not limited to S, O, a sulfonyl group, a $C_{1-3}$ linear methylene group, a difluoro methylene group, a hexafluoro propylene group, and a heteroaromatic ring, and n is in the range of about 20 to about 1000.

The side chains $R_1$, $R_2$, $R_3$, and $R_4$ are bonded to a urea group or urethane group of the polyurea resin. At least one of the side chains $R_1$, $R_2$, $R_3$, and $R_4$ is an alkylsulfonic acid group or a carboxylic acid group. For example, all of the side chains $R_1$, $R_2$, $R_3$, and $R_4$ may be the alkylsulfonic acid group or the carboxylic acid group, or some of the side chains $R_1$, $R_2$, $R_3$, and $R_4$ may be the alkylsulfonic group or the carboxylic acid group.

The alkylsulfonic acid or the carboxylic acid that form at least one of the side chains $R_1$, $R_2$, $R_3$, and $R_4$ include an active hydrogen group that conducts protons and thereby the solid polymer electrolyte for a fuel cell has proton conductivity.

The other side chains may include, but are not limited to hydrogen, a $C_{1-4}$ alkyl group, and a functional group that includes a $C_{6-9}$ aromatic ring. The $C_{1-4}$ alkyl group may be a methyl group, an ethyl group, a propyl group, or a butyl group. The functional group including a $C_{6-9}$ aromatic ring may be a phenyl group, a benzyl group, a phenylethyl group, or a phenylpropyl group, for example. When the alkyl group includes more than 4 carbons, or the functional group including an aromatic ring contains more than 9 carbons, the aromatic polyurea resin backbone exhibits undesirably low crystallinity and low heat resistance due to the side chains $R_1$, $R_2$, $R_3$, and $R_4$.

The aromatic polyurea resin backbone has excellent heat resistance and excellent chemical resistance, and can increase the heat resistance and mechanical strength of the solid polymer electrolyte for a fuel cell.

The aromatic polyurea resin includes at least one urea group and the urethane group, depending on the monomer used. Each of the urea group and the urethane group include an active hydrogen bonded to nitrogen. The active hydrogen reacts with various functional groups such that the side chains $R_1$, $R_2$, $R_3$, and $R_4$ combine with the polyurea resin. For example, the alkylsulfonic group is formed by a ring opening reaction of a sultone, or the like. As for the carboxylic acid, an ester compound including an isocyanate group at its end is bonded to the polyurea resin and the ester is subjected to hydrolysis so that a side chain including a carboxylic acid at its end may be obtained.

The aromatic urea resin may be obtained by reacting aromatic polyisocyanate and aromatic polyamine, for example.

The polyisocyanate may be tolylene diisocyanate, diphenylmethane diisocyanate (MDI), 4,4'-diphenylether diisocyanate (ODI), xylene diisocyanate, naphthalene diisocyanate, 4,4'-diphenylsulfide diisocyanate, 4,4'-diphenylsulfoxide diisocyanate, diphenylethane diisocyanate, diphenylpropane diisocyanate, diphenyldifluoromethane diisocyanate, diphenylhexafluoropropylene diisocyanate, derivatives of these, and the like. If needed, more than one of these aromatic polyisocyanates may be used together.

The concentration of the isocyanate group is given by NCO %. The NCO % of polyisocyanate may be in the range of about 20% to about 48%, preferably about 25% to about 48%. When the NCO % of polyisocyanate is outside this range, the solid polymer electrolyte for a fuel cell has low heat resistance and low mechanical strength.

The aromatic polyamine may be 4,4'-diphenyletherdiamine (ODA), polytetraethyleneoxide-di-P-aminobenzoate, 4,4'-diamino-3,3'-diethylamino-5,5'-diaminodiphenylmethane, 2,2',3,3'-tetrachloro-4,4'-diaminodiphenylmethane, 3,3'-dichloro-4,4'-diaminodiphenylmethane, trimethylenebis (4-aminobenzoate), 3,5'-dimethylthiotoluenediamine, 2,3-diaminopyridine, 2,5-diaminopyridine, 2,6-diaminopyridine, 3,4-diaminopyridine, or the like. These aromatic polyamines may also be used together. Preferably, the aromatic polyamine may be 4,4'-diphenyletherdiamine (ODA). The NCO % of the amine group may be in the range of about 28% to about 200%, and preferably about 28% to about 150%. When the NCO % of the amine group is outside this range, the solid polymer electrolyte for a fuel cell has decreased mechanical strength.

The NCO % of the reaction product obtained from a reaction between the aromatic polyisocyanate and the aromatic polyamine may be in the range of about 90% to about 110%, and preferably about 95% to about 105%. When the NCO % of the reaction product is outside this range, a solid polymer electrolyte for a fuel cell with enough heat resistance and strength cannot be obtained.

The urea group and/or the urethane group in the polyurea resin may react with the side chains $R_1$, $R_2$, $R_3$, and $R_4$ in the presence of a solvent according to a known method of synthesizing polyurethane.

When a substituent that is to be bonded to $R_1$, $R_2$, $R_3$, and $R_4$ is an alkylsulfonic acid group, a sultone is bonded to the urea group and/or the urethane group of the polyurea resin by a ring-opening reaction.

Scheme 1 represents an example of this reaction. As shown in Scheme 1, sodium hydride or the like may be added to a polyurea resin represented by Formula 3-1 such that an active hydrogen bonded to nitrogen of the urea group or urethane group is substituted with sodium as represented by Formula 3-2. The sodium is then reacted with a sultone compound, as represented by Formula 3-3. At this time, the sultone compound undergoes the ring-opening reaction and is attached to the polyurea resin to be a side chain, as represented by Formula 3-4. The polyurea resin including the sultone compound is substituted using an acid such that a sulfonic acid group derived from the sultone compound is formed at the end of the side chain of the compound represented by Formula 3-4. The polyurea resin including the sulfonic acid group is represented by Formula 3-5. The sultone compound may be an (alkyl)propansultone or a butanesultone, for example.

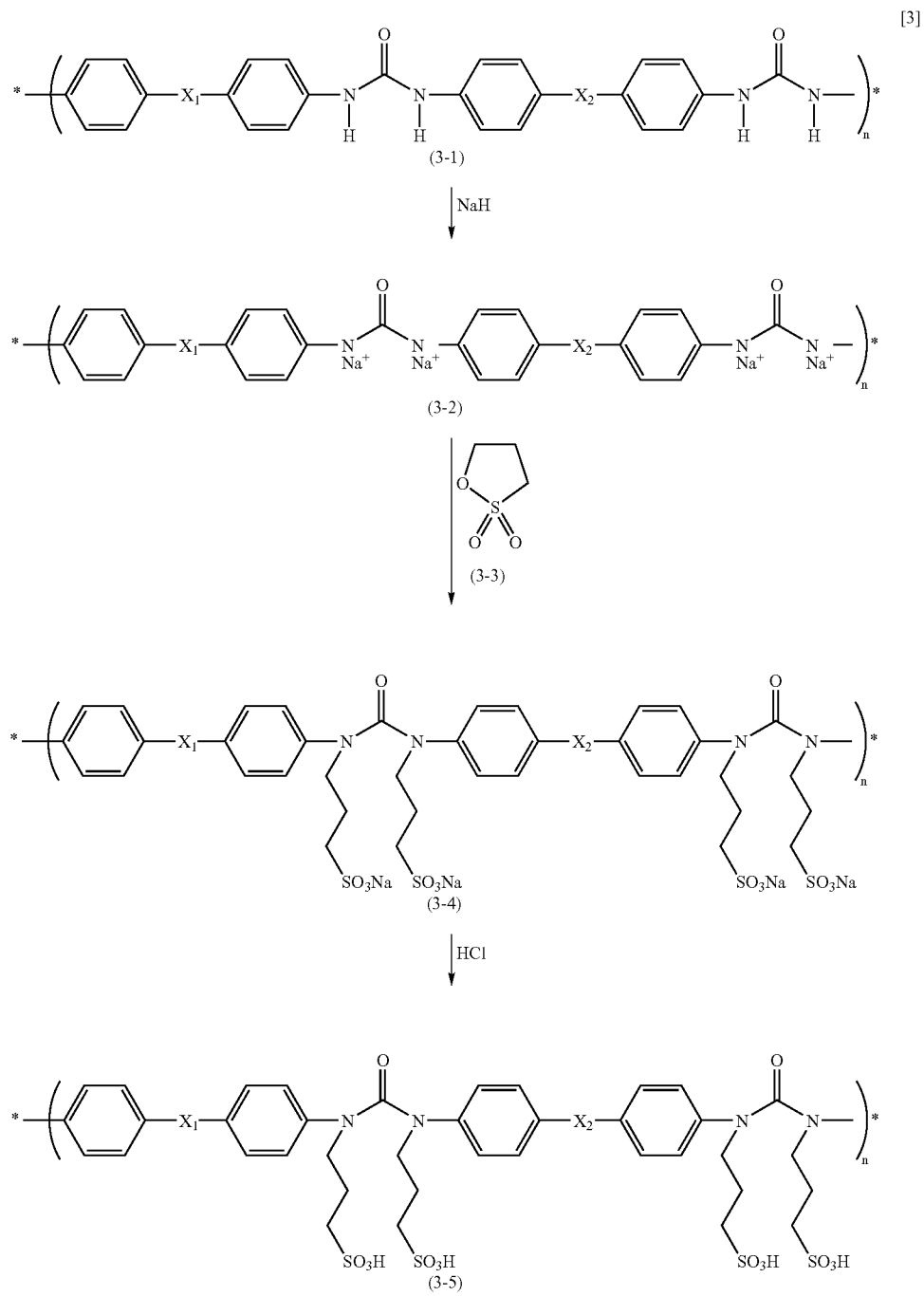

When a substituent that is to be bonded to the side chains $R_1$, $R_2$, $R_3$, and $R_4$ is a carboxylic acid group, an ester compound having an isocyanate group at its end is bonded to the urea group and/or the urethane group of the polyurea resin and the ester is subjected to hydrolysis.

The ester compound including an isocyanate group at its end may be isocyanato butylacetate, isocyanato ethylacetate, ethyl benzoate, ethyl isocyanato propionate, or the like.

The urea group and/or urethane group of the polyurea resin react with the ester compound that includes an isocyanate group at its end in the presence of a solvent according to a known method of synthesizing polyurethane. This reaction may be carried out as illustrated in Scheme 2. In Scheme 2, the solvent may be dimethylformamide, dimethylsulfoxide, dimethylacetoamide, and the like. If needed, a urethanizing catalyst may be used. The urethanizing catalyst may be a tin (Sn) compound.

In addition, the ester of the reaction product represented by Formula 4-2 produced by a reaction between the urea groups and/or the urethane group of the polyurea resin and the ester compound including an isocyanate group at its end may be transformed into a carboxylic acid by known hydrolysis.

Scheme 2

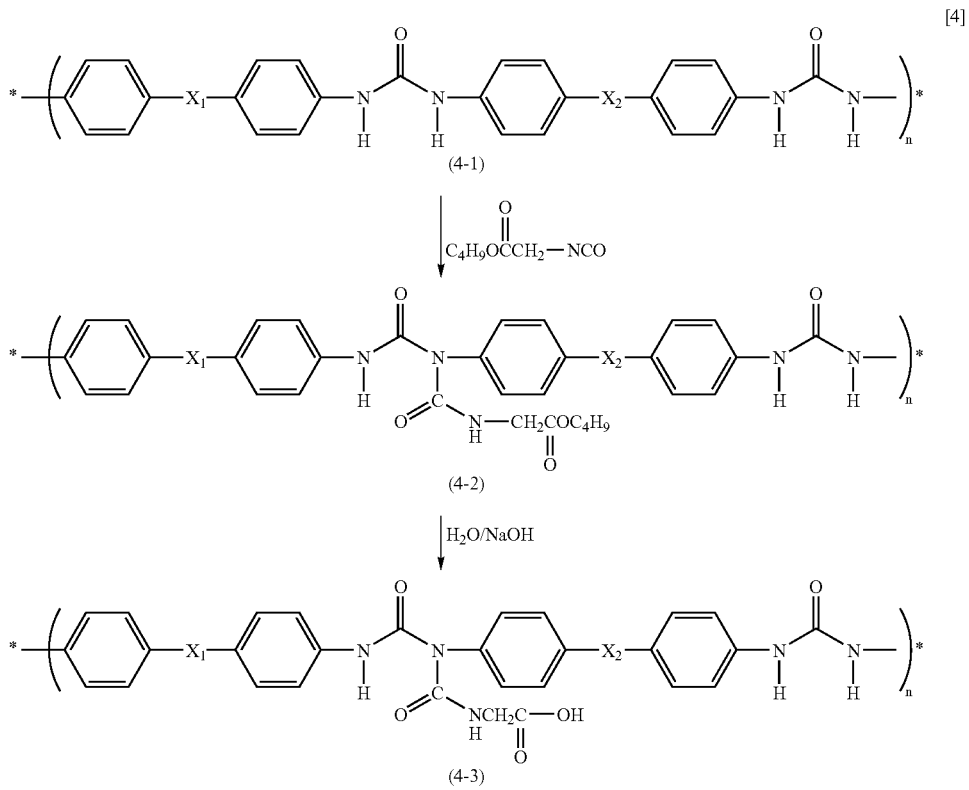

In addition, the solid polymer electrolyte for a fuel cell according to the present embodiment may be prepared by impregnating a proton conductive resin with at least one acid. The acid may be a phosphoric acid or a phosphonic acid, for example. The impregnating amount or doping amount of the acid may be in the range of about 4 mole to about 32 mole based on 1 mole of the repeated unit of the proton conductive resin represented by Formula 2. By impregnating the proton conductive resin with, for example, the phosphoric acid, the proton conductivity of the solid polymer electrolyte may be increased.

A fuel cell according to an embodiment of the present invention will now be described in detail. The fuel cell includes a solid polymer electrolyte as described above as a proton conductive polymer membrane.

The fuel cell includes a cathode, an anode, and a proton conductive polymer membrane interposed in between the cathode and the anode. Hydrogen fuel is oxidized at the anode, thus producing protons and electrons. The protons are transported via the polymer membrane to the cathode, to which oxygen is also provided. Meanwhile, the electrons that are generated in the anode flow to the cathode through an external load that is connected to the fuel cell and react with protons and oxygen at the cathode, thus producing water.

The electrodes of the fuel cell may comprise a conductive material, a binder, and a catalyst. The conductive material may be any material with electric conductivity such as various metals or a carbon material. For example, the conductive material may be a carbon black compound such as acetylene black and the like, activated charcoal, graphite, or the like. These materials may be used alone or in combination.

The binder may include the proton conductive resin of the present invention. However, the binder may also include other resins, preferably, a fluorinated resin with water repellency, more preferably a fluorinated resin with a melting point of 400° C. or less, such as polytetrafluoroethylene and tetrafluoroethylene-perfluoroalkylvinyl ether copolymer, for example.

The catalyst may be a metal that promotes the oxidation of hydrogen and the reduction of oxygen. The catalyst may be Pb, Fe, Mn, Co, Cr, Ga, V, W, Ru, Ir, Pd, Pt, Rh, or an alloy of these, but is not limited thereto.

As described above, the use of the solid polymer electrolyte for a fuel cell of the present invention may increase proton conductivity, heat resistance, and mechanical strength. In addition, the fuel cell of the present invention may improve electricity generating properties.

Example 1

In an argon atmosphere, 1.040 g of 4,4'-diphenyletherdiamine (ODA) was dissolved in 15 mL of N-methylpyrrolidone, and 1.250 g of diphenylmethanediioscyanate (MDI) was slowly dripped thereto. Then, the resulting solution was heated to 120° C. for 3 hours and immersed in methanol so that a white aromatic polyurea resin (PU-MDOD) was obtained.

Then, in an argon atmosphere, 0.120 g of sodium hydride (NaH) was dispersed in 10 mL of N-methylpyrrolidone at 80° C. In addition, 1.035 g of the PU-MDOD obtained above was dissolved in 10 mL of N-methylpyrrolidone. The PU-MDOD in N-methylpyrrolidone was slowly dripped into the NaH in N-methylpyrrolidone. After the resulting solution became transparent, 0.681 g of 1,4-butanesultone was added to produce a solid. The solid was separated by filtering under a reduced pressure and washed with ethanol to produce a sodium salt of a proton conductive resin in light yellow solid (s-PU-MDOD(Na)). The s-PU-MDOD(Na) was dissolved in dimethylacetoamide (DMAc).

The resulting solution was cast onto a glass substrate and dried at 80° C., thus producing a transparent light yellow film. The film was immersed in a 1 M HCl solution for more than 12 hours so that a Na ion was substituted with a hydrogen ion. As a result, a film of a proton conductive resin (s-PU-MDOD (H)) was obtained. In particular, an aromatic polyurea resin including an alkylsulfonic acid group at its side chain, which is a solid polymer electrolyte membrane of Example 1, was obtained. The solid polymer electrolyte membrane was about 37 μm thick.

Scheme 3 shows a process from the synthesis of the aromatic polyurea resin to the synthesis of the proton conductive resin in Example 1. s-PU-MDOD(H) of Example 1 is represented by Structural Formula 2. The structure represented by Structural Formula 2 was obtained from Structural Formula 1 where $X_1$ is O, $X_2$ is $CH_2$, each of $R_1$ through $R_3$ is H, and $R_4$ is $OC_3H_6SO_3H$.

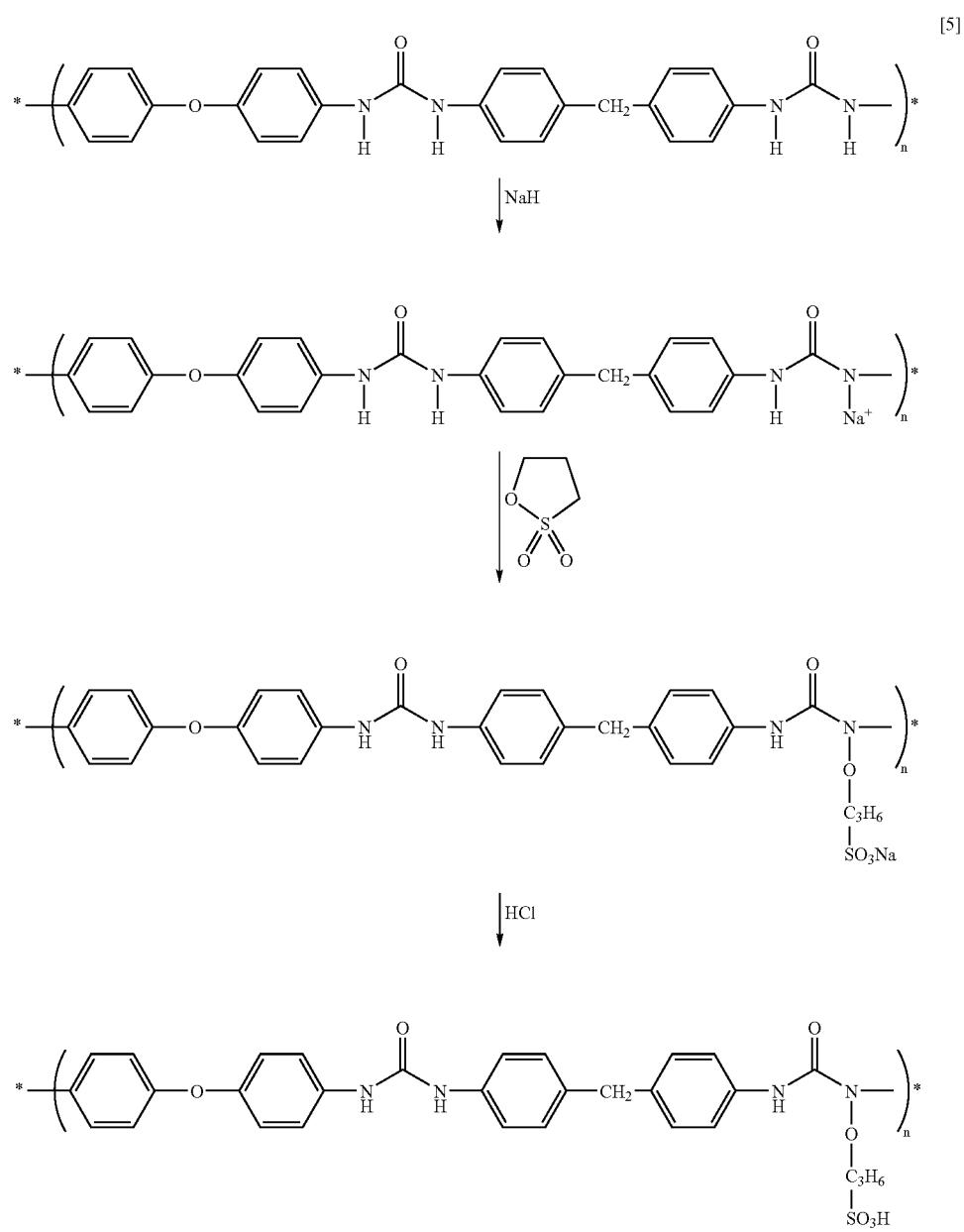

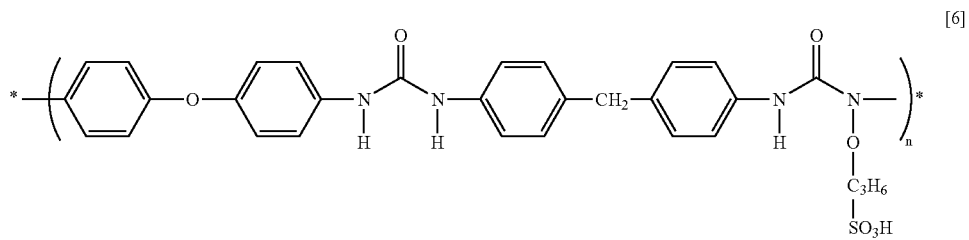

Structural Formula 2

Example 2

A proton conductive resin (s-PU-ODOD(H)) film was produced in the same manner as in Example 1 except that 4,4-diphenyletherdiisocyanate (ODI) was used instead of diphenylmethanediisocyanate (MDI). Thus, an aromatic polyurea resin that includes an alkylsulfonic acid group as its side chain, which is a solid polymer electrolyte membrane of Example 2, was obtained. The solid polymer electrolyte membrane was about 41 μm thick.

Scheme 4 represents a process from the synthesis of the aromatic polyurea resin to the synthesis of the proton conductive resin in Example 2. s-PU-ODOD(H) of Example 2 is represented by Structural Formula 3. The structure represented by Structural Formula 3 was obtained from the structure of Structural Formula 1 where each of $X_1$ and $X_2$ is O, each of $R_1$ through $R_3$ is H, and $R_4$ is $OC_3H_6SO_3H$.

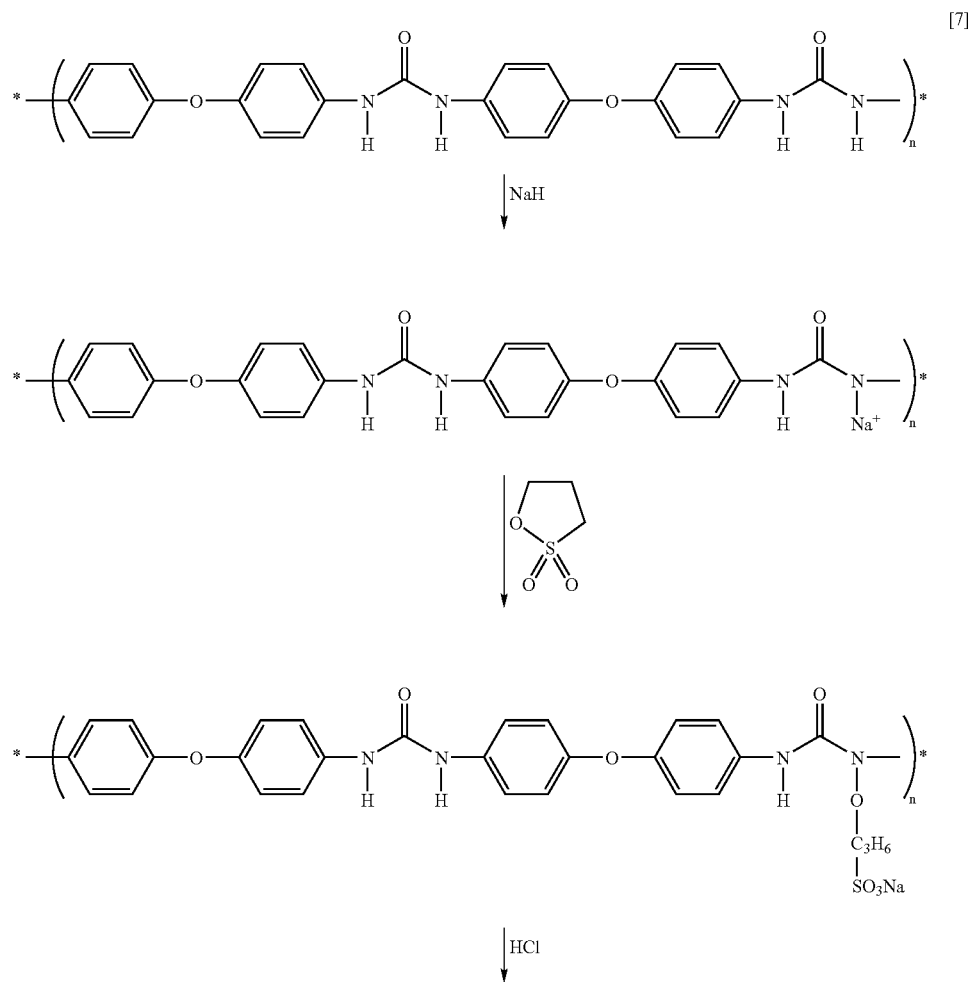

Scheme 4

-continued

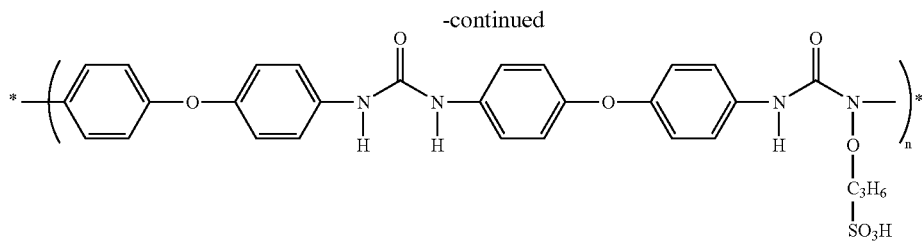

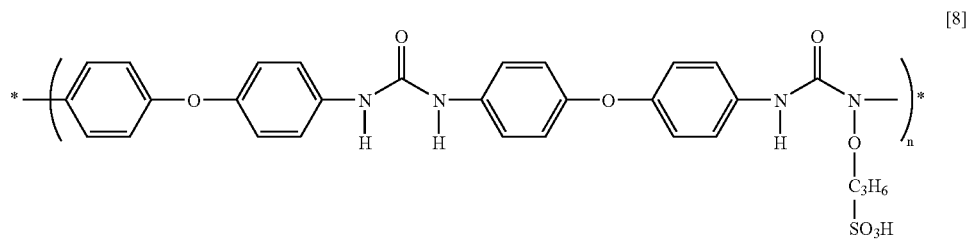

Structural Formula 3

Example 3 s-PU-MDOD(Na) obtained in Example 1 was immersed in 85% phosphoric acid for 12 hours such that the phosphoric acid was impregnated in the proton conductive resin. The proton conductive resin impregnated with phosphoric acid is a solid polymer electrolyte membrane of Example 3 and is about 35 μm thick.

Comparative Example 1

Polyetheretherketone was sulfonated by injecting 25 g of polyetheretherketone (commercially available) and 125 mL of a concentrated sulfuric acid into a flask and stirring the mixture at room temperature in a nitrogen atmosphere for 48 hours. Then, the stirred mixture was slowly dripped into 3 L of deionized water, thus precipitating sulfonated polyetheretherketone. The sulfonated polyetheretherketone was separated by filtering the reaction mixture. The filtered sulfonated polyetheretherketone was formed into a film in the same manner as in Example 1, thus producing a transparent light yellow film, which is a solid polymer electrolyte membrane of Comparative Example 1.

The ion exchange capacities and proton conductivities of the solid polymer electrolyte membranes of Example 1, Example 2, Example 3, and Comparative Example 1 were measured in the following manner and the results are shown in Table 1.

Proton conductivity was measured by forming an electrode by arranging and pressing Pt lines with a diameter of 0.2 mm at intervals of 5 mm on the surface of a long and narrow shaped electrolyte membrane. Then, a 1 kHz alternating current was applied to the electrode and resistance was measured using an impedance analyzer. The proton conductivity was given by $1/(R \times T \times D)$ where R is the gradient of the interval of the electrode and resistance, T is the thickness of the electrolyte membrane, and D is the width of the electrolyte membrane. The proton conductivity was measured at 80° C. in a humidity of 95%.

The ion exchange capacity was measured by drying a long and narrow shaped electrolyte membrane at 80° C. under a reduced pressure for 12 hours. The weight of the resulting electrolyte membrane was measured. The electrolyte membrane was immersed in 40 mL of a 1 M NaCl aqueous solution for more than 12 hours. 20 mL of the NaCl aqueous solution in which the electrolyte membrane was immersed was sampled and a NaOH aqueous solution was added thereto to measure the amount of an acid in the system. The ion exchange capacity (meq/g) was given by M/W where M is the molarity of the acid in the system and W is the weight of the dried membrane.

TABLE 1

| | Proton Conductivity (S/cm) | Ion Exchange Capacity (meq/g) |
|---|---|---|
| Example 1 | $7.8 \times 10^{-2}$ | 1.71 |
| Example 2 | $7.2 \times 10^{-2}$ | 1.69 |
| Example 3 | $7.6 \times 10^{-3}$ | — |
| Comparative Example 1 | $4.2 \times 10^{-3}$ | 2.91 |

The proton conductivities of solid polymer electrolyte membranes of Example 3 and Comparative Example 1 were also measured at 100° C. The results are shown in Table 2.

TABLE 2

| | Proton Conductivity (S/cm) |
|---|---|
| Example 3 | $1.5 \times 10^{-4}$ |
| Comparative Example 1 | $7.8 \times 10^{-8}$ |

As shown in Table 1, although the ion exchange capacities of the solid polymer electrolyte membranes of Example 1 and Example 2 are smaller than that of the solid polymer electrolyte membrane of Comparative Example 1, the proton conductivities of the solid polymer electrolyte membranes of Example 1 and Example 2 are larger than that of the solid polymer electrolyte membrane according to Comparative Example 1.

Ion exchange capacity is proportional to the number of the side chains that are bonded to the proton conductive resin backbone. Although the solid polymer electrolyte membranes of Example 1 and Example 2 include a small number of side chains, they exhibit high proton conductivities. Typically, as the number of side chains of the resin decreases, the crystallinity of the resin itself increases, thus increasing heat resistance. Therefore, it appears that the solid polymer electrolytes of Example 1 and Example 2 may have an excellent heat resistance.

In addition, as shown in Table 2, the proton conductivity of the electrolyte membrane of Example 3 that is impregnated with phosphoric acid is much higher than the proton conductivity of the electrolyte membrane of Comparative Example 1 at 100° C. Thus, it may be ascertained that a fuel cell including a proton conductive resin that is impregnated with a phosphoric acid exhibits excellent electricity generating properties at a temperature higher than 100° C.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A solid polymer electrolyte for a fuel cell, comprising: a proton conductive resin of Structural Formula 1

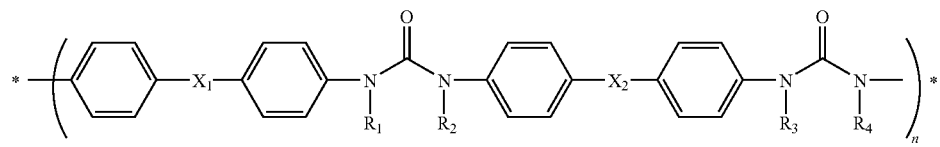

Structural Formula 1 having side chains $R_1$, $R_2$, $R_3$ and $R_4$ bonded to an aromatic polyurea resin backbone, wherein each of $X_1$ and $X_2$ is selected from the group consisting of S, O, a sulfonyl group, a $C_{1-3}$ linear methylene group, a difluoromethylene group, a hexafluoropropylene group, and a hetero aromatic ring, wherein at least one of the side chains $R_1$, $R_2$, $R_3$ and $R_4$ is an alkylsulfonic acid group or a carboxylic acid group, and wherein n is in the range of about 20 to about 1000.

2. The solid polymer electrolyte of claim 1,
wherein the side chains $R_1$, $R_2$, $R_3$, and $R_4$ that are not an alkylsulfonic acid group or a carboxylic acid group are at least one selected from the group consisting of H, a $C_{1-4}$ alkyl group, and a functional group including a $C_{6-9}$ aromatic ring.

3. The solid polymer electrolyte of claim 1,
wherein the proton conductive resin is impregnated with an acid.

4. The solid polymer electrolyte of claim 3,
wherein the acid is selected from the group consisting of a phosphoric acid and a phosphonic acid.

5. A fuel cell, comprising:
the solid polymer electrolyte of claim 1.

6. A proton conductive resin as shown in Structural Formula 1, comprising:
an aromatic polyurea resin backbone;
and side chains $R_1$, $R_2$, $R_3$ and $R_4$,
Structural Formula 1

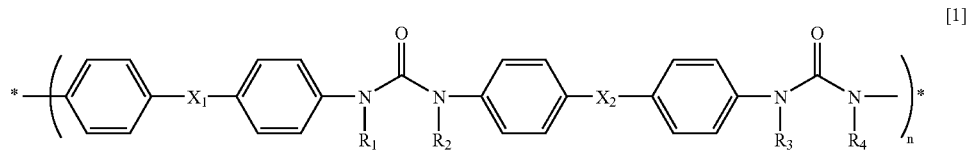

Structural Formula 1 wherein each of $X_1$ and $X_2$ is selected from the group consisting of S, O, a sulfonyl group, a $C_{1-3}$ linear methylene group, a difluoromethylene group, a hexafluoropropylene group, and a hetero aromatic ring, wherein at least one of the side chains $R_1$, $R_2$, $R_3$, and $R_4$ is an alkylsulfonic acid group or a carboxylic acid group, and wherein n is in the range of about 20 to about 1000.

7. The proton conductive resin of claim 6,
wherein side chains other than $R_1$, $R_2$, $R_3$, and $R_4$ are at least one selected from the group consisting of H, a $C_{1-4}$ alkyl group, and a functional group including a $C_{6-9}$ aromatic ring.

8. The proton conductive resin of claim 6,
wherein the proton conductive resin is impregnated with an acid.

9. The proton conductive resin of claim 8,
wherein the acid is selected from the group consisting of a phosphoric acid and a phosphonic acid.

* * * * *